United States Patent
Tsuge et al.

(10) Patent No.: US 10,514,093 B2
(45) Date of Patent: Dec. 24, 2019

(54) SHIFT CONTROL SYSTEM FOR VEHICLE

(71) Applicant: Toyota Jidosha Kabushiki Kaisha, Toyota-shi (JP)

(72) Inventors: Shogo Tsuge, Susono (JP); Ayumu Sagawa, Toyota (JP); Akira Takeichi, Susono (JP); Takashi Okubo, Ashigarakami-gun (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 3 days.

(21) Appl. No.: 15/903,790

(22) Filed: Feb. 23, 2018

(65) Prior Publication Data
US 2018/0245521 A1 Aug. 30, 2018

(30) Foreign Application Priority Data
Feb. 24, 2017 (JP) .................. 2017-033455

(51) Int. Cl.
| F16H 61/02 | (2006.01) |
| F16H 59/18 | (2006.01) |
| F16H 59/48 | (2006.01) |
| F16H 3/66 | (2006.01) |

(52) U.S. Cl.
CPC ......... *F16H 61/0213* (2013.01); *F16H 59/18* (2013.01); *F16H 3/663* (2013.01); *F16H 3/666* (2013.01); *F16H 59/48* (2013.01); *F16H 2059/183* (2013.01); *F16H 2061/0227* (2013.01)

(58) Field of Classification Search
CPC .... F16H 59/18; F16H 59/48; F16H 2059/183; F16H 61/0213; F16H 2061/0227; F16H 2061/0223; F16H 2061/0234
See application file for complete search history.

(56) References Cited

U.S. PATENT DOCUMENTS

| 10,190,683 B2* | 1/2019 | Kikkawa ............... F16H 61/662 |
| 2013/0046450 A1* | 2/2013 | Gentile ............... F16H 61/0213 |
| | | 701/56 |
| 2014/0155223 A1 | 6/2014 | Suzuki |

FOREIGN PATENT DOCUMENTS

| JP | 2006-112564 | 4/2006 |
| JP | 2006-152959 | 6/2006 |
| JP | 2007-85481 A | 4/2007 |
| JP | 2010-7749 A | 1/2010 |
| JP | 2011-185386 A | 9/2011 |

(Continued)

*Primary Examiner* — Erin D Bishop
(74) *Attorney, Agent, or Firm* — Oblon, McClelland, Maier & Neustadt, L.L.P.

(57) ABSTRACT

A shift control system for vehicle includes a transmission that performs an upshift based on an accelerator opening, comprising: a detector that detects a longitudinal acceleration the vehicle, a calculator that calculates a change amount per unit time of the accelerator opening, and a controller that controls the transmission. The controller repeatedly executes upshift to reduce a speed ratio of the transmission based on a second condition that determines a shift timing of the upshift, upon satisfaction of a first condition. The first condition is satisfied if the acceleration increasing the vehicle speed is greater than or equal to a predetermined first threshold value, the change amount is in a stable state falling within a certain range, and a time period that the change amount keeps falling within the certain range has exceeded a second threshold value.

5 Claims, 5 Drawing Sheets

(56) References Cited

FOREIGN PATENT DOCUMENTS

| JP | 2012-6441 | 1/2012 |
| JP | 2014-98464 | 5/2014 |
| WO | WO 2013/015029 A1 | 1/2013 |
| WO | WO 2016/092934 A1 | 6/2016 |

* cited by examiner

|  | C1 | C2 | C3 | C4 | B1 | B2 |
|---|---|---|---|---|---|---|
| 1ST | ○ | × | × | × | × | ○ |
| 2ND | ○ | × | × | × | ○ | × |
| 3RD | ○ | × | ○ | × | × | × |
| 4TH | ○ | × | × | ○ | × | × |
| 5TH | ○ | ○ | × | × | × | × |
| 6TH | × | ○ | × | ○ | × | × |
| 7TH | × | ○ | ○ | × | × | × |
| 8TH | × | ○ | × | × | ○ | × |

○ : Engaged
× : Disengaged

SHIFT CONTROL SYSTEM FOR VEHICLE

CROSS REFERENCE TO RELATED APPLICATIONS

The present application claims the benefit of priority to Japanese Patent Application No. 2017-033455 filed on Feb. 24, 2017 with the Japanese Patent Office, the entire contents of which are incorporated herein by reference in its entirety.

BACKGROUND

Field of the Disclosure

The present disclosure relates to a shift control system for vehicle including an automatic transmission.

Discussion of the Related Art

A control system of an automatic transmission performs shift control in accordance with a predetermined shift map, based on a driving situation determined by an accelerator opening-extent and a vehicle speed. In that kind of system, there is known a control system of an automatic transmission that, when a depressing operation of an accelerator pedal by which a change amount of the accelerator opening-extent becomes greater than or equal to a first threshold value and less than a second threshold value is performed, shifts to an accelerator return sensation mode (a second shift mode), whereby a busy shift where automatic shift is frequently executed is controlled (refer to JP-A-2006-112564, for example). In the accelerator return sensation mode, a second shift map that enables selection of every other gear stage of all the gear stages is employed to, for example, not upshift from third gear to fourth gear, and from fourth gear to fifth gear, but upshift from third gear to fifth gear.

Moreover, there is known a shift control system of a continuously variable transmission that, in order to judge an acceleration intention of a driver, employs a vehicle speed change amount, without employing a change amount of an actual accelerator opening-extent (refer to JP-A-2014-098464, for example).

There is known a drive power control system for vehicle that, when an accelerator opening-extent is greater than or equal to a constant value and a change amount of an accelerator operation amount is included between a certain value A and a certain value B, for example, and the change amount of the acceleration operation amount lies between a certain value X and a certain value Y, shifts to an expansion feeling improvement mode that changes an electronic throttle control signal synchronously with a shift (refer to JP-A-2006-152959, for example).

There is known a shift control system of a stageless transmission that, when it has been judged that a longitudinal acceleration of a vehicle is less than or equal to a threshold value and it has been judged based on an accelerator closing speed and a return amount from a maximum accelerator opening-extent that there is an acceleration demand, shifts to a linear mode that sets a speed ratio such that an input speed of the continuously variable transmission rises (refer to WO-A-13/015029, for example).

There is known a driving support system that, when an operation amount of an accelerator pedal has entered a vehicle speed control start range, starts vehicle speed control for maintaining a running speed of a vehicle at a desired speed, and when the operation amount of the accelerator pedal has deviated from a vehicle speed control continuation range including the vehicle speed control start range, releases vehicle speed control (refer to JP-A-2012-006441, for example).

In the system described in JP-A-2006-112564, when the change amount of the accelerator opening-extent is in a certain range, a driver is judged to be not demanding a large change in drive power. However, even in the case of a state where the change amount of the accelerator opening-extent is in the certain range (a state where the change amount of the accelerator opening-extent is stable at a certain value), sometimes, during a state where longitudinal acceleration of a vehicle is large (a state where the accelerator pedal is being firmly depressed), the driver is demanding a large drive power. In this case, if the accelerator return sensation mode is shifted to, sometimes, the drive power feels reduced and the driver is given a sense of incongruity. Therefore, regarding shift control, for example, made in response to an acceleration operation by the driver, there is further room for improvement in configuring such that good acceleration performance is obtained.

SUMMARY

This disclosure has been made noting the above-described technical problems, and has an object of providing a shift control system for vehicle that can improve an acceleration feeling in shift control responding to an acceleration operation by a driver.

The embodiment of the present disclosure relates to a shift control system for vehicle including an automatic transmission that performs an upshift based on an increase in a vehicle speed. In order to achieve the above-described object, the shift control system is provided with: a detector that detects a longitudinal acceleration of the vehicle; a calculator that calculates a change amount per unit time of an accelerator opening that changes in response to a depression of an accelerator pedal; and a controller that controls the automatic transmission. The controller repeatedly executes upshift to reduce a speed ratio of the automatic transmission based on a second condition that determines a shift timing of the upshift, upon satisfaction of a first condition. The first condition is satisfied if the acceleration increasing the vehicle speed is greater than or equal to a predetermined first threshold value, the change amount is in a stable state falling within a certain range, and a time period that the change amount keeps falling within the certain range has exceeded a second threshold value.

In a non-limiting embodiment, the second condition may make it a condition that a time interval at which the upshift is repeatedly executed has been fixed at a constant time.

In a non-limiting embodiment, the second condition may make it a condition that a shift interval at which the upshift is repeatedly executed has been fixed at a constant engine speed.

In a non-limiting embodiment, the second condition may make it a condition that a shift interval at which the upshift is repeatedly executed has been fixed at a plurality of engine speeds aligned in order of time lapse on a locus representing a predetermined change rate.

In a non-limiting embodiment, the certain range may be a range less than a third threshold value and exceeding a fourth threshold value smaller than the third threshold value, the third threshold value may be a deviation width on a positive side that the accelerator opening-extent is increased, with respect to a reference value which is the change amount during the stable state, the fourth threshold value may be a deviation width on a negative side that the accelerator opening-extent is decreased, with respect to the reference value, and an absolute value of the third threshold value may be a value larger than an absolute value of the fourth threshold value.

Due to this disclosure, when a first condition holds, an upshift is repeatedly executed based on a second condition that determines a shift timing of the upshift. Therefore, an acceleration performance desired by a driver during shift can be obtained. As a result, an acceleration feeling of the vehicle can be improved.

Due to the disclosure in which the upshift is executed every time a predetermined constant time elapses, an acceleration feeling having a constant rhythm can be enacted on the driver.

Due to the disclosure in which the upshift is executed every time an engine speed reaches a predetermined engine speed, a tone generated along with revolution of an engine attains a constant rhythm, hence a comfortable acceleration feeling can be enacted on the driver.

Due to the disclosure in which the upshift is executed such that the engine speed representing the shift timing of the upshift attains a predetermined change rate, an acceleration feeling as if a sound volume of the engine is getting gradually smaller, for example, can be enacted on the driver.

Due to the disclosure in which an absolute value of a third threshold value has been set to a value larger than an absolute value of a fourth threshold value, a margin is provided on an increase side of an accelerator opening-extent, hence even if a depression position of an accelerator pedal is depressed slightly to a depression side from a stable state position, a second shift mode can be continued.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
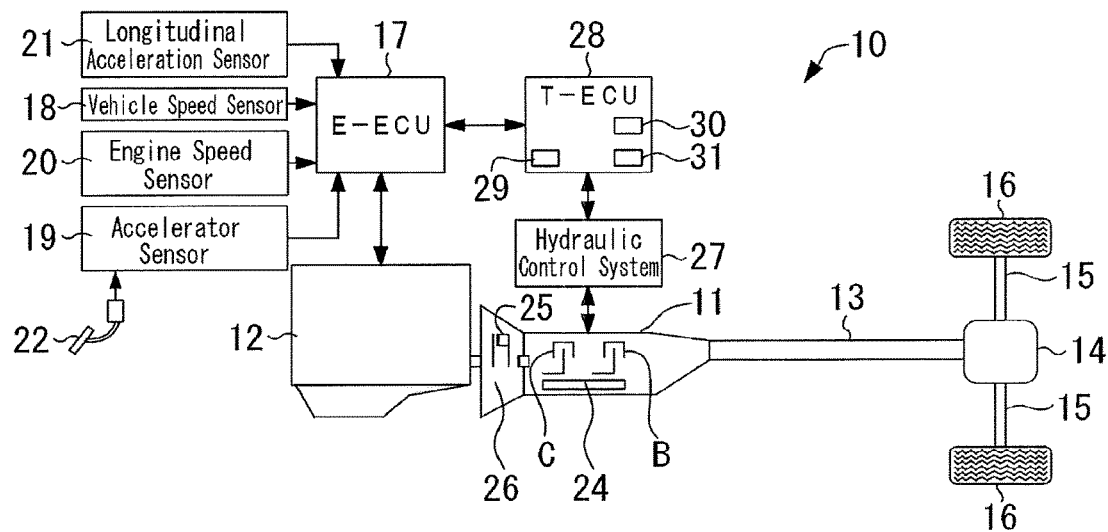
FIG. 1 is a schematic illustration showing one example of a vehicle including an automatic transmission in an embodiment of this disclosure.

FIG. 1 shows one example of a vehicle 10 including an automatic transmission 11 in an embodiment of this disclosure. As shown in FIG. 1, the vehicle 10 includes an engine (ENG) 12 as a prime mover and the automatic transmission 11. The automatic transmission 11 is coupled to an output side of the engine 12. The automatic transmission 11 is a geared transmission that sets a plurality of gear stages whose speed ratios are different from each other by manipulating frictional engagement devices. An output side of the automatic transmission 11 has a propeller shaft (an output shaft) 13 coupled thereto, and the output shaft 13 is coupled to a differential gear 14 which is a final reduction gear unit. Drive power (torque) outputted from the automatic transmission 11 is transmitted from the differential gear 14 to left and right drive wheels 16 via left and right axles 15.

The engine 12 is configured such that supply or ignition timing of fuel or number of combustion chambers can be electrically controlled by an engine electronic control unit (to be abbreviated as the "E-ECU" hereinafter) 17. The E-ECU 17 is configured having a microcomputer as its main constituent, and is configured so as to perform calculation using inputted data or pre-stored data, and output a result of that calculation to the engine 12 in the form of command signal. The E-ECU 17 has connected thereto the likes of a vehicle speed sensor 18, an accelerator sensor 19, an engine speed sensor 20, and an acceleration sensor 21, and, as data indicating a running state of the vehicle 10, receives input from each of the sensors 18 to 21 of information such as a vehicle speed (V), an accelerator opening ($\theta$), an engine speed (Ne), and a longitudinal acceleration (G) of the vehicle 10. The accelerator sensor 19 detects an opening ($\theta$) of the accelerator based on a depression amount of an accelerator pedal 22. The acceleration sensor 21 as a detector detects the longitudinal acceleration (G) of the vehicle 10.

The automatic transmission 11 includes: a geared transmission 24 in which a gear stage is shifted according to engagement states of clutches C and brakes B; and a torque converter 26 having a lock-up clutch 25 disposed on an input side of the geared transmission 24. The vehicle 10 further includes a hydraulic control system 27 that controls engagement of the lock-up clutch 25, the clutch C, and the brake B. The hydraulic control system 27 controls a line pressure by an electrically controlled valve, and, moreover, controls the likes of supply and discharge of oil pressure to the lock-up clutch 25, the clutch C, the brake B, and so on, and oil pressure for setting a transmission torque transmitting capacity of the clutch C or the brake B. The hydraulic control system 27 may have a configuration similar to that of an oil pressure control section provided in a conventionally known vehicular automatic transmission.

The vehicle 10 further includes a transmission electronic control apparatus (to be abbreviated as the "T-ECU" hereinafter) 28 that controls the automatic transmission 11 via the hydraulic control system 27. The T-ECU 28 is configured having a microcomputer as its main constituent, and is data communication capably connected to the above-described E-ECU 17. Therefore, the T-ECU 28 receives input of data such as the vehicle speed (V), the engine speed (Ne), the accelerator opening ($\theta$), and the longitudinal acceleration (G). The T-ECU 28 is configured so as to perform calculation using data such as the vehicle speed (V), the accelerator opening ($\theta$), the engine speed (Ne), and the longitudinal acceleration (G), and pre-stored data, and output a calculation result to the hydraulic control system 27 in the form of command signal. The data pre-stored in the T-ECU 28 includes a shift map. As an example, the shift map is a map determining a region of a gear stage governed by the vehicle speed (V) and the accelerator opening ($\theta$), and is configured such that an upshift line and a downshift line are set, a judgment of upshift is established by the running state determined by the vehicle speed (V) and the accelerator opening-extent ($\theta$) changing so as to cross the upshift line, and, moreover, a judgment of downshift is established by the running state changing so as to cross the downshift line. This shift map is set to a fuel efficiency-emphasizing shift map, and a shift mode executing a shifting operation based on the shift map is referred to as a first shift mode.

The T-ECU 28 includes a calculator 29 that calculates a change amount per unit time (a time change amount) of the accelerator opening (θ). Moreover, the T-ECU 28 has: a determiner 30 that determines whether a drivability-emphasizing shift is required or not; and a mode shifter 31 that switches the shift mode between the first shift mode and a drivability-emphasizing shift mode (a second shift mode).

The automatic transmission 11 in the embodiment of this disclosure may use a CVT (Continuously Variable Transmission), besides the previously mentioned kind of staged transmission employing the geared transmission 24 and the clutch C or brake B. Even when the continuously variable transmission is used, the automatic transmission is provided with the oil pressure control section for executing its shift operation. Moreover, a configuration is adopted such that by electrically controlling operation of an electromagnetic valve, and so on, in that oil pressure control section, the speed ratio set by the automatic transmission can be automatically controlled. When the continuously variable transmission is used, control is performed so as to execute a shift mode that controls the speed ratio such that, as in the geared transmission, the speed ratio is changed in stages whereby the vehicle speed (V) increases while the engine speed (Ne) repeats gradual increase and gradual decrease.

Figure 2:
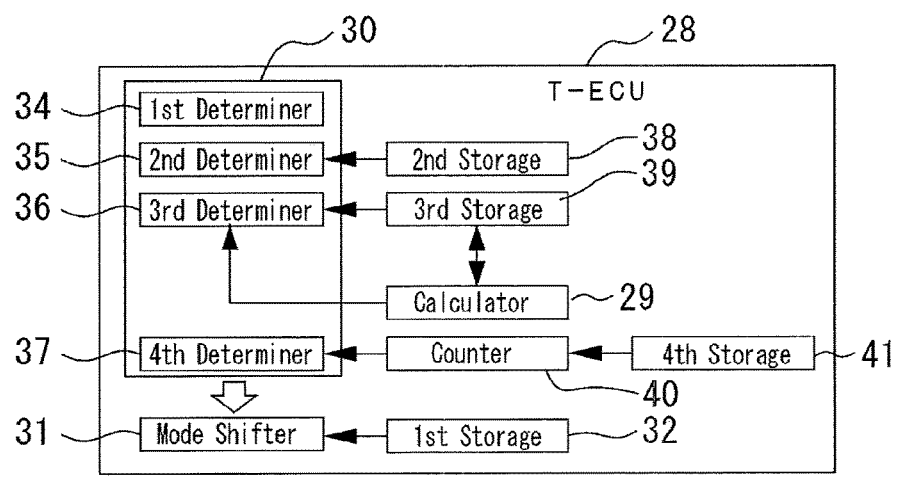
FIG. 2 is a block diagram showing functions of the controller.

FIG. 2 shows the determiner 30 and the mode shifter 31. As shown in FIG. 2, the determiner 30 judges whether a drivability-emphasizing shift is required by holding of a first condition. The mode shifter 31 switches the shift mode from the first shift mode to the second shift mode when the determiner 30 has judged that a drivability-emphasizing shift is required. The second shift mode repeatedly executes upshift based on a second condition, in other words, a condition that sets a shift interval (T) constant. Now, n expresses the number of times a shift has been executed. A shift interval (Tn) is a time interval from a finish time point of a shift control to a start time point of the next shift control, and, for example, is set to the same interval as the shift interval (Tn−1) of the previous time. In other words, the T-ECU 28 includes a first storage 32 that stores the shift interval (Tn−1) of the previous time. The shift interval (Tn) is stored updated in the first storage 32 every time a shift is implemented. The T-ECU 28 sets the shift interval (Tn−1) of the previous time read from the first storage 32, in the second shift mode. For example, when the second shift mode has been shifted to, the shift interval (Tn−1) stored during the final shift in the first shift mode executed immediately before is set to the shift interval (Tn) in the second shift mode.

Note that the constant shift interval (Tn) is not limited to the shift interval (Tn−1) immediately before, and, for example, may be set to the shift interval (Tn−2) two before, or, moreover, may be set to a predetermined constant shift interval (Ta). Moreover, the second condition is not limited to setting to the shift interval (Tn−1) of the previous time, and, for example, may be set so as to change the constant shift interval (Ta) such that the larger than a reference value the longitudinal acceleration (G) is, the more the constant shift interval (Ta) is lengthened, and, moreover, such that the smaller than the reference value the longitudinal acceleration (G) is, the more the constant shift interval (Ta) is shortened.

A situation where a drivability-emphasizing shift becomes required is a situation where the accelerator pedal 22 is being depressed to a certain extent whereby the vehicle 10 is accelerating, and a situation where a state that a depression position of the accelerator pedal 22 is stable in a constant position is continued for more than a certain time. In a situation where the accelerator pedal 22 is being held in a constant position, it is easy for a driver to be aware of acceleration of the vehicle 10 and to be aware of a change in the likes of shift timing, for example, a tone of the engine speed. Conversely, in a situation where the depression position of the accelerator pedal 22 is unstable, the driver is adjusting acceleration of the vehicle 10. In such a situation, it is difficult for the driver to feel incongruity in acceleration of the vehicle 10, hence shift is executed with a shift timing that emphasizes fuel efficiency.

The first condition is that the driver is depressing the accelerator pedal 22, that the vehicle 10 is running with the longitudinal acceleration (G) of the vehicle 10 being greater than or equal to a predetermined value, that the depression amount of the accelerator pedal 22 is stable in substantially a constant position, and that a state of the accelerator pedal 22 being stable in the constant position continues for more than a certain time.

The determiner 30 includes a first determiner 34, a second determiner 35, a third determiner 36, and a fourth determiner 37. The first determiner 34 judges whether the accelerator pedal 22 is being depressed (power-on). The second determiner 35 judges whether the longitudinal acceleration (G) of the vehicle 10 exceeds a predetermined first threshold value. The first threshold value is a threshold value for judging whether the accelerator pedal 22 is being depressed to a certain extent, and is expressed by a positive value indicating an increase in speed of the vehicle 10. Note that the T-ECU 28 includes a second storage 38, and that the first threshold value is pre-stored in the second storage 38. The second determiner 35 judges whether the longitudinal acceleration (G) of the vehicle 10 is less than a predetermined fifth threshold value. The fifth threshold value is a threshold value for judging that the accelerator pedal 22 is not being depressed to a certain extent, and is expressed by a negative value indicating a decrease in speed of the vehicle 10. The fifth threshold value is pre-stored in the second storage 38.

Note that an absolute value of the first threshold value and an absolute value of the fifth threshold value may be set to the same value, or may be set to different values. When set to different values, it is better for the absolute value of the first threshold value to be set to a larger value than the absolute value of the fifth threshold value. As a result, a permissible width that the driver is judged to have an acceleration intention is broadened, hence a shift procedure to the second shift mode can be continued unchanged.

The third determiner 36 judges whether the time change amount of the accelerator opening-extent (θ) attains a stable state falling within a predetermined range. The predetermined range is a range less than a second threshold value and exceeding a third threshold value smaller than the second threshold value. The third determiner 36 judges whether the depression position of the accelerator pedal 22 is in a stable state in a constant position. The second threshold value is a threshold value of a time change amount on an increase side of the accelerator opening (θ), in other words, a threshold value in a direction of depressing the accelerator pedal 22 (a positive direction) of the accelerator opening (θ), with respect to a reference value. The third threshold value is a threshold value of a time change amount on a decrease side of the accelerator opening (θ), in other words, a threshold value in a direction of returning the accelerator pedal 22 (a negative direction) of the accelerator opening (θ), with respect to the reference value. In other words, the second threshold value and the third threshold value are deviation widths on a positive side and a negative side from the reference value. The reference value is a position where the accelerator pedal 22 is held in substantially a constant position, in other words, a position where the time change amount of the accelerator opening (θ) is substantially zero.

In reality, even when the driver intends to hold the depression position of the accelerator pedal 22 in a constant position, output of the accelerator opening (θ) does not become constant due to the likes of vibration of the vehicle 10 or drift of a signal, and consequently, the time change amount of the accelerator opening (θ) drifts. In this embodiment, when the time change amount of the accelerator opening (θ) enters a predetermined range (permissible range) of a certain width, the time change amount at that time point is regarded as the reference value. The T-ECU 28 includes a third storage 39, and the second threshold value and the third threshold value are pre-stored in the third storage 39. Moreover, the third storage 39 stores the accelerator opening-extent (θ) for each time, and has stored therein the time change amount of the accelerator opening (θ) calculated by a calculator 29.

In this embodiment, an absolute value of the second threshold value and an absolute value of the third threshold value may be set to the same value, in other words, so as to have the same deviation width with respect to the reference value, or may be set to different values. When the absolute value of the second threshold value and the absolute value of the third threshold value are set to different values, the absolute value of the second threshold value may be set to a larger value than the absolute value of the third threshold value. In other words, the second threshold value is a first deviation width which is the one where the time change amount of the accelerator opening-extent (θ) changes to a depression side of the accelerator pedal 22, and the third threshold value is a second deviation width which is the one where the time change amount of the accelerator opening (θ) changes to a return side of the accelerator pedal 22. Providing a margin in the first deviation width which is the one where the driver is judged to have an acceleration intention makes it possible for the second shift mode to be continued even if the depression position of the accelerator pedal is depressed slightly to the depression side from a stable state position. Conversely, the second deviation width is the one of the deviation widths where the driver is judged not to have an acceleration intention. Therefore, the second deviation is not provided with a margin. Consequently, when the accelerator pedal 22 is returned from the constant position, a shift is immediately made from the second shift mode to the first shift mode. Note that the second threshold value is one example of a third threshold value in the embodiment of this disclosure. The third threshold value is one example of a fourth threshold value in the embodiment of this disclosure.

The fourth determiner 37 judges whether a count value of a counter 40 has exceeded a predetermined fourth threshold value. The fourth determiner 37 judges whether a continuous time of a state judged by the third determiner 36, in other words, a state that the depression position of the accelerator pedal 22 is stable in a constant position, has exceeded the fourth threshold value.

The T-ECU 28 includes a counter 40 and a fourth storage 41. The counter 40 executes clocking of the shift interval during each shift or clocking in the fourth determiner 37. The fourth threshold value is stored in the fourth storage 41.

Note that the T-ECU 28 is one example of a controller in the embodiment of this disclosure. Moreover, the first storage 32, the second storage 38, the third storage 39, and the fourth storage 41 are separately provided, but may be configured by one storage instead. Furthermore, information of a stroke amount or rotation angle of the accelerator pedal 22 may be adopted instead of the accelerator opening (θ). In this case, for example, an accelerator sensor that detects a depression angle (or a depression amount or rotation angle) of the accelerator pedal 22 is provided instead of the accelerator sensor 19. Moreover, the previously mentioned embodiment is described assuming it to have a plurality of ECUs, in other words, the E-ECU 17 and the T-ECU 28. However, the disclosure is not limited to this, and may be configured by one ECU.

Figures 3, 4:
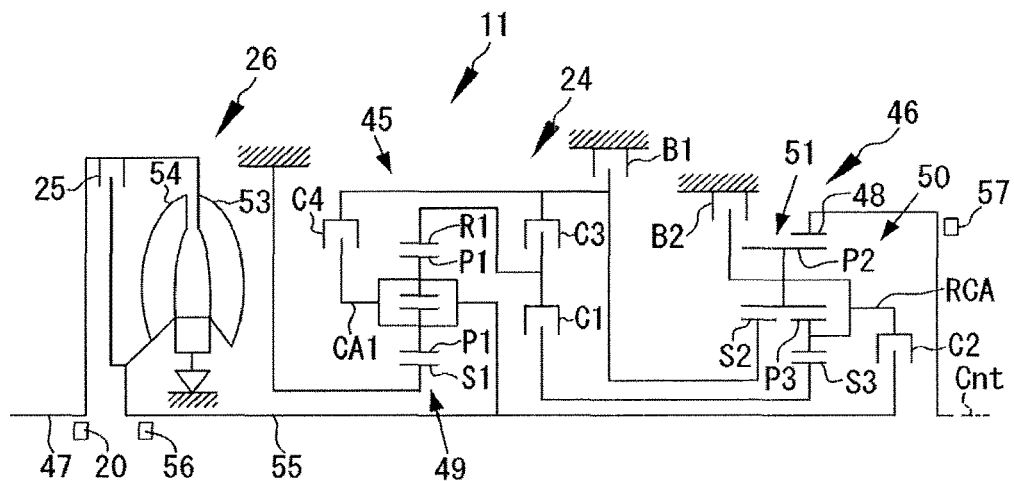
FIG. 3 is a skeleton diagram showing one example of the automatic transmission.
FIG. 4 is table indicating engagement states of an engagement devices in each gear stage.

FIG. 3 shows one example of the automatic transmission 11. As shown in FIG. 3, the geared transmission 24 of the automatic transmission 11 includes a first speed change section 45 and a second speed change section 46 on a rotational central axis Cnt of an output shaft 47 of the engine 12, drive power outputted from the engine 12 is transmitted to an input shaft 47, and drive power obtained from the input shaft 47 is increased/decreased to be outputted to an output member 48. The first speed change section 45 is configured having as its main constituent a single-pinion type first planetary gear mechanism 49. The first planetary gear mechanism 49 has: a first sun gear S1; a first carrier CA1 that rotatably holds pinion gears P1; and a first ring gear R1. The second speed change section 46 is configured by a Ravigneaux type planetary gear mechanism formed by combining a double-pinion type second planetary gear mechanism 50 and a single-pinion type third planetary gear mechanism 51. The second planetary gear mechanism 50 and the third planetary gear mechanism 51 have a second sun gear S2 and a third sun gear S3, and have a carrier RCA used commonly and a ring gear R2 used commonly. Pinion gears P3 of the third planetary gear mechanism 51 individually engage with second pinion gears P2 of the second planetary gear mechanism 50. Note that this disclosure is not limited to the configuration of the skeleton diagram shown in FIG. 3, and there may be a configuration similar to that of a conventionally known vehicular automatic transmission.

Drive power transmitted to the input shaft 47 is inputted to the torque converter 26. The torque converter 26 transmits to the geared transmission 24, via an operation fluid, drive power outputted from the engine 12. The output member 48 of the geared transmission 24 is a member for transmitting drive power to the differential gear 14, via the output shaft 13, and is a counter driving gear, for example. Note that the geared transmission 24 or torque converter 26 shown in FIG. 3 are configured substantially symmetrically with respect to the rotational central axis Cnt, and a half below the rotational central axis Cnt is omitted in FIG. 3.

The lock-up clutch 25 is configured so as to be changed to a completely engaged state, a slip state, or a released state by oil pressure control of the hydraulic control system 27, and, when the vehicle speed (V) attains a certain level, is set to the completely engaged state, whereby a pump impeller 53 and a turbine runner 54 are integrally rotated.

The geared transmission 24 includes the following as an engagement device for establishing the plurality of gear stages whose speed ratios differ, namely, a first clutch C1, a second clutch C2, a third clutch C3, a fourth clutch C4, a first brake B1, and a second brake B2. The first clutch C1 through fourth clutch C4 and the first brake B1 and second brake B2 are, for example, an oil pressure type frictional engagement device switched to an engaged state and a released state by oil pressure.

The automatic transmission 11 is provided with the engine speed sensor 20 that detects the engine speed, and with a turbine speed sensor 56 that detects an output shaft speed (i.e., a speed of an input shaft 55) of the torque converter 26. Furthermore, the automatic transmission 11 is provided with an output shaft speed sensor 57 that detects a speed of the output member 48. Signals obtained from the engine speed sensor 20, the turbine speed sensor 56, and the output shaft speed sensor 57 are sent to the T-ECU 28. The vehicle speed (V) is a value corresponding to the speed of the output member 48.

FIG. 4 shows one example of operation of the engagement device establishing the gear stages of the automatic transmission 11 described in FIG. 3. In FIG. 4, the engagement device in an engaged state when configuring the gear stages (from a first stage (1ST) to an eighth stage (8TH) of forward movement) is expressed as "O", and the engagement device in a released state when configuring the gear stages is expressed as "X". As shown in FIG. 4, the automatic transmission 11 establishes the gear stage of any one of the first stage to the eighth stage by combinations of the engagement device changing the engaged states. Note that by changing the entire engagement device to the released state, the engagement device can be established in neutral (N) and parking (P). Upshift directed from the first stage toward the eighth stage is a shift where speed ratio becomes sequentially smaller.

Figure 5:
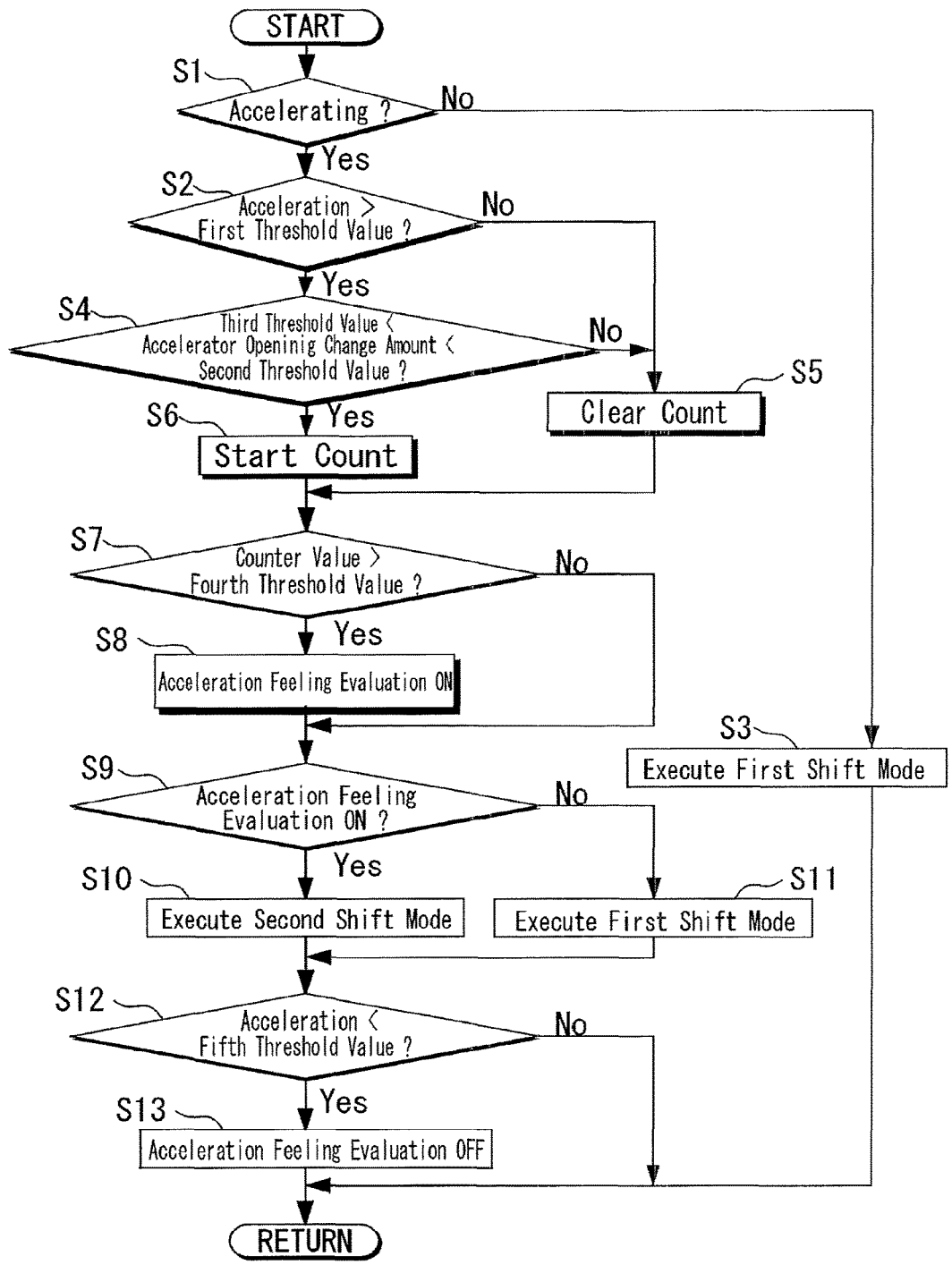
FIG. 5 is a flowchart showing one example of a routine executed by the control system according to the embodiment.

FIG. 5 shows one example of an operation procedure of the determiner 30 and the mode shifter 31. Note that FIG. 5 shows the operation procedure when executing upshift. The operation procedure shown in FIG. 5 is repeatedly performed every time a constant time has elapsed, when the engine 12 is running, for example. As shown in FIG. 5, at step S1, the first determiner 34 judges whether acceleration is occurring or not, in other words, whether the accelerator pedal 22 is being depressed or not. If the answer of step S1 is Yes, the routine shifts to step S2. Otherwise, if the answer of step S1 is No, the routine shifts to step S3 to execute the first shift mode, and then returns.

At step S2, the second determiner 35 judges whether the longitudinal acceleration (G) of the vehicle 10 exceeds the first threshold value or not. If the answer of step S2 is Yes, the routine shifts to step S4. Otherwise, If the answer of step S2 is No, the procedure shifts to step S5 to clear a count value of the counter 40.

At step S4, the third determiner 36 judges whether the time change amount of the accelerator opening (θ) is less than the second threshold value and is exceeding the third threshold value, or not. In other words, the third determiner 36 judges whether the accelerator pedal 22 is stable in a constant position or not. If the answer of step S4 is Yes, the procedure shifts to step S6. Otherwise, if the answer of step S4 is No, the procedure shifts to step S5 to enter the routine executing the first shift mode.

At step S6, the fourth determiner 37 starts a count by the counter 40 from a time point when affirmative judgment has been made in step S4. Then, the procedure shifts to step S7.

At step S7, the fourth determiner 37 judges whether the count value of the counter 40 has exceeded the fourth threshold value or not. In other words, the fourth determiner 37 judges whether a continuous time that the depression position of the accelerator pedal 22 is in a stable state has exceeded the fourth threshold value or not. If the answer of step S7 is Yes, the routine shifts to step S8. Otherwise, if the answer of step S7 is No, the routine shifts to step S9.

At step S8, the determiner 30 judges the first condition to have held and sets acceleration feeling evaluation to ON. Then, the routine shifts to step S9.

At step S9, the mode shifter 31 judges whether acceleration feeling evaluation is ON or not. In other words, the mode shifter 31 monitors acceleration feeling evaluation. If the answer of step S9 is Yes, the routine shifts to step S10. Otherwise, if the answer of step S9 is No, the routine shifts to step S11 to enter the routine executing the first shift mode.

At step S10, the mode shifter 31 switches the shift mode from the first shift mode to the second shift mode. Then, the routine shifts to step S12.

At step S12, the second determiner 35 judges whether the longitudinal acceleration (G) of the vehicle 10 is less than the predetermined fifth threshold value or not. If the answer of step S12 is Yes, the routine shifts to step S13. Otherwise, if the answer of step S12 is No, the routine shifts to return and enters a routine continuing the second shift mode.

At step S13, the determiner 30 judges a predetermied condition not to hold and sets acceleration feeling evaluation to OFF Then, the routine returns.

Note that the embodiment described in FIG. 5 shows one example of an operation procedure for judging whether to shift to the second shift mode or not. For example, an order of executing judgments of the first determiner 34 through third determiner 36 is not limited to the order described in FIG. 5. Moreover, although the determiner 30 judges acceleration feeling evaluation to be OFF in other words, judges the first condition not to hold when the longitudinal acceleration (G) has become less than the fifth threshold value in the second determiner 35, the disclosure is not limited to this, and the determiner 30 may judge the first condition not to hold at a time point when a negative judgment has been made by at least one of the first determiner 34 through third determiner 36. Furthermore, the embodiment described in FIG. 5 adopts an example where the shift mode is switched, but the disclosure is not limited to this, and this disclosure may adopt a configuration that executes control of a kind displacing the upshift line, for example, displacing a shift point on a vehicle speed side, of the shift map so as to satisfy the second condition.

Figure 6:
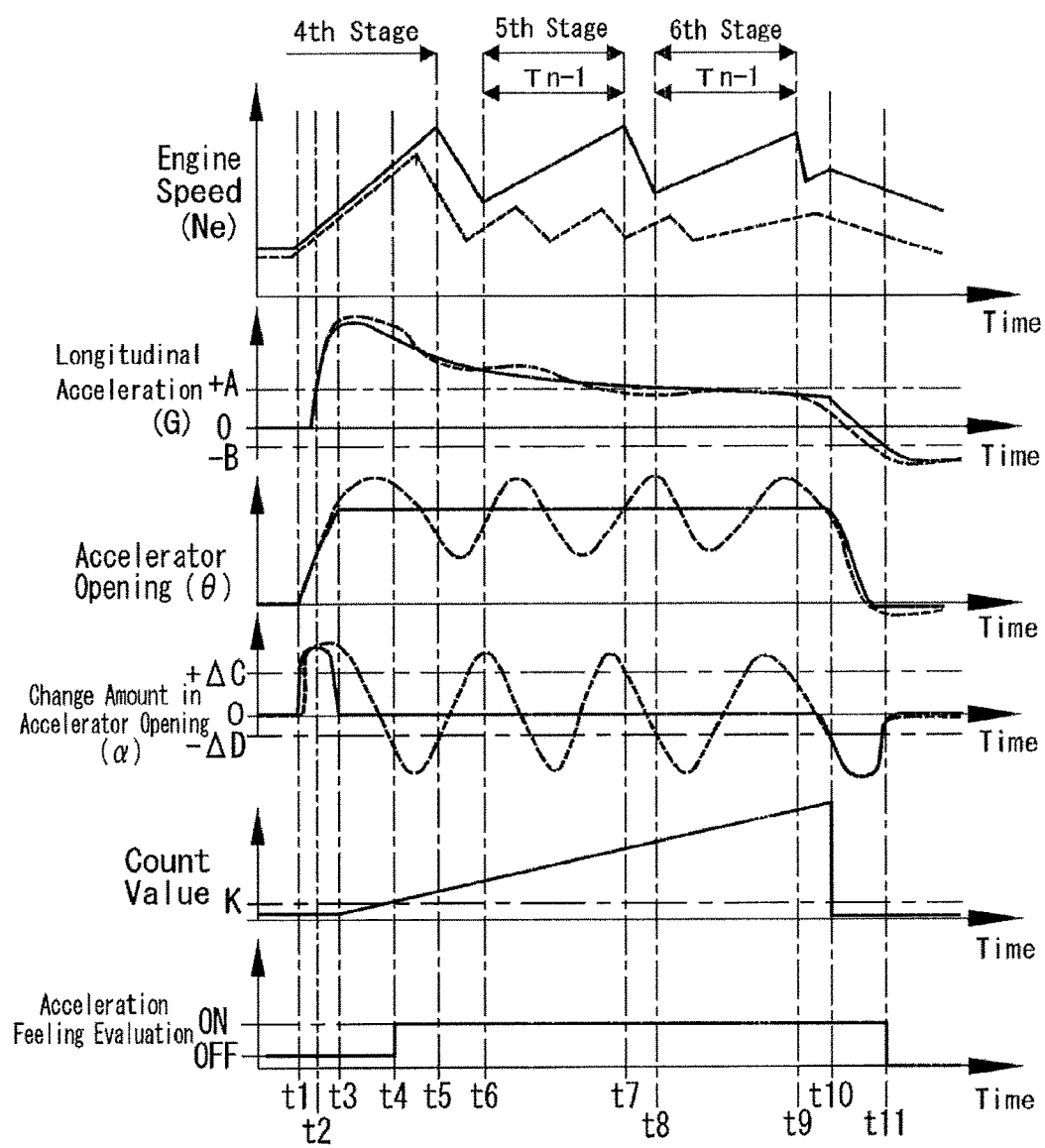
FIG. 6 is a time chart showing temporal changes in situation of the vehicle during upshift.

FIG. 6 shows one example of operation of each section during upshift. Each section represents, in order from above on the vertical axis of FIG. 6, the engine speed (Ne), the longitudinal acceleration (G) of the vehicle 10, the accelerator opening (θ), the time change amount (a) of the accelerator opening (θ), the count value of the counter 40, and the acceleration feeling evaluation (the judgment of the determiner 30). In the beginning of the example shown in FIG. 6, the vehicle 10 is running at a speed higher than a predetermined vehicle speed (V) in the fourth stage, and the accelerator pedal 22 is not being depressed (power-off).

The accelerator pedal 22 has been depressed at time t1 during running in the fourth stage. As a result, the engine speed (Ne), the accelerator opening (θ), and the time change amount of the accelerator opening-extent (θ) are raised from time t1. In addition, the longitudinal acceleration (G) of the vehicle 10 rises, slightly delayed from time t1.

At time t2, the longitudinal acceleration (G) of the vehicle 10 exceeds the first threshold value +A. Now, the longitudinal acceleration (G) of the vehicle 10 is expressed assuming an increase in speed of the vehicle 10 to be a positive value and assuming a decrease in speed of the vehicle 10 to be a negative value. The first threshold value +A shown in same FIG. 6 is a positive threshold value, and the fifth threshold value −B shown in same FIG. 6 is a negative threshold value. Note that as previously mentioned, the absolute value A of the first threshold value +A is set to a larger value than the absolute value B of the fifth threshold value −B.

In a period from time t1 to time t2, the driver depresses the accelerator pedal 22 to a certain extent, and the vehicle 10 is in a greatly accelerated state. Moreover, between time t2 and time t3, the accelerator pedal 22 attains a state of being held in a constant position. At this time, the driver is still demanding a large acceleration.

At time t3, in the third determiner 36, the accelerator opening (θ) attains a constant position, in other words, the time change amount of the accelerator opening (θ) attains a reference value 0 which is zero. Subsequently, the time change amount of the accelerator opening need only fall within a range less than the second threshold value +ΔC and exceeding the third threshold value −ΔD. As a result, at time t3, the fourth determiner 37 starts a count by the counter 40. Note that as previously mentioned, the absolute value ΔC of the second threshold value +ΔC is set to a larger value than the absolute value ΔD of the third threshold value −ΔD.

At time t4, the fourth determiner 37 judges that the count value of the counter 40 has exceeded the fourth threshold value K. As a result, at time t4, the determiner 30 sets acceleration feeling evaluation to ON. In response to this, the mode shifter 31 switches the shift mode to the second shift mode. When switching to the second shift mode is performed, a shift request to the fifth stage is outputted at time t5 or immediately before time t5.

At time t5, shift control to the fifth stage is started. Moreover, at time t6, shift control to the fifth stage finishes.

Specifically, the fourth clutch C4 is released and the second clutch C2 is engaged to shift the gear stage from the fourth stage to the fifth stage to reduce a speed ratio.

From when the fourth clutch C4 has been released, for example, engine-torque-down control is executed to start an inertia phase. At least one of ignition timing control and intake air amount control, for example, may be adopted as the engine-torque-down control. The engine-torque-down control is executed to bring the engine speed (Ne) close to a synchronous speed of the gear stage after shift. When a differential speed of the engine speed (Ne) and the synchronous speed of the gear stage after shift attains a certain value or less, oil pressure of the second clutch C2 is increased towards a pressure corresponding to a line pressure in the hydraulic control system 27, for example. As a result, shift control finishes.

The T-ECU 28, when executing the second shift mode, reads the shift interval (Tn−1) of the previous time stored in the first storage 32, and repeatedly executes upshift while the first condition holds, based on the read shift interval (Tn−1).

In other words, shift control of the sixth stage is started at time t7 after the shift interval (Tn−1) has elapsed from time t6 when shift control of the fifth stage has finished. Then, similarly, at time t8, shift control of the sixth stage finishes. Shift control of the sixth stage is started at time t9 after the shift interval (Tn−1) has elapsed from time t8 when shift control of the sixth stage has finished. In a period from time t3 to time t9, there is a state where the accelerator opening (θ) is held constant, and the change amount of the accelerator opening is maintained at a constant value. Therefore, upshift is repeatedly executed at a constant shift interval (Tn−1).

The dotted lines shown in FIG. 6 show an example of the fuel efficiency-emphasizing first shift mode, and show a state where the depression position of the accelerator pedal 22 is not fixed in a certain position, in other words, a state where the driver is assumed to have an intention to adjust the vehicle speed (V). In the first shift mode, when the accelerator pedal 22 is firmly depressed, the vehicle speed (V) rises, hence upshift is implemented based on the shift map that fixes the gear stage based on the running state determined by a relationship of the vehicle speed (V) and the accelerator opening (θ). Regarding the upshift shown by the dotted lines of same FIG. 6, the shift control starts from a peak of the engine speed (Ne) between time t4 and time t5, and the shift control finish at a bottom of the engine speed (Ne) between time t5 and time t6. The same applies also to subsequent peaks and bottoms.

In the second shift mode, upshift is executed at the constant shift interval (Tn−1), hence a comfortable acceleration feeling can be enacted on the driver. In the period from time t3 to time t9, the depression position of the accelerator pedal 22 after the accelerator pedal 22 has been firmly depressed is held in a constant position, hence the longitudinal acceleration (G) of the vehicle 10 in the second shift mode lowers more gently and more smoothly descending to the right, compared to the longitudinal acceleration (G) of the vehicle 10 in the first shift mode whose time change amount of the accelerator opening-extent is larger than that during the second shift mode.

At time t10, the driver returns the accelerator pedal 22, whereby the time change rate (a) of the accelerator opening-extent (θ) becomes less than the third threshold value −ΔD. At this time, the third determiner 36 clears the count of the counter 40.

Subsequently, the longitudinal acceleration (G) of the vehicle 10 lowers sharply. At time t11, the longitudinal acceleration (G) of the vehicle 10 becomes less than the fifth threshold value −B. In other words, at time t11, the determiner 30 judges the first condition to not hold, and sets acceleration feeling evaluation to OFF. As a result, the mode shifter switches the shift mode from the second shift mode to the first shift mode.

In the above-described embodiment, fixing to a constant time the time interval at which upshift is repeatedly executed, is adopted as the second condition. However, the disclosure is not limited to this, and the second condition may make a condition of having a certain regularity.

Figure 7:
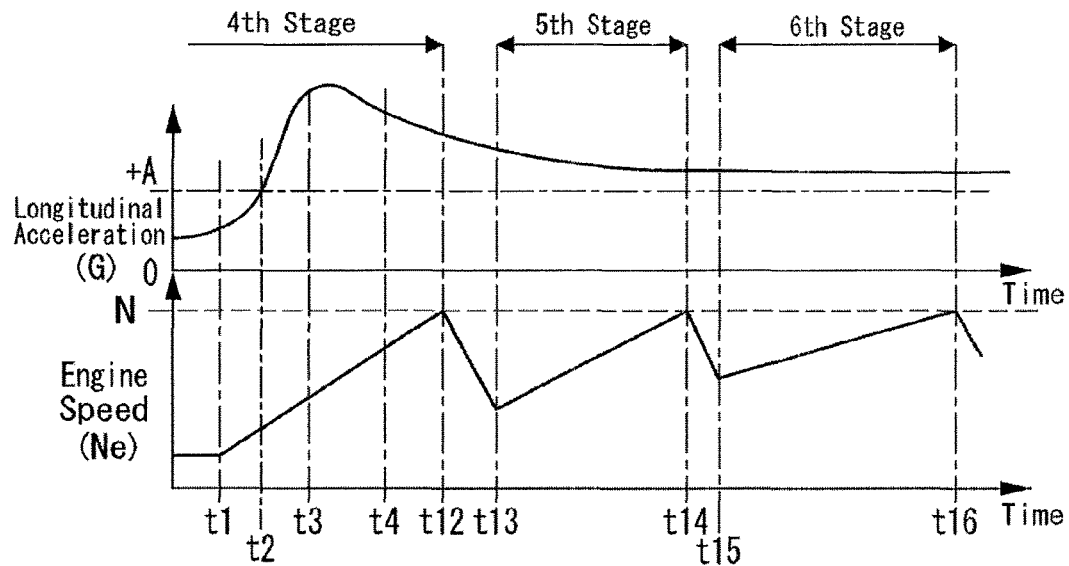
FIG. 7 is a time chart showing another embodiment of a second shift mode.

FIG. 7 shows a separate embodiment of the second shift mode. In the embodiment shown in FIG. 7, fixing by a constant engine speed (Ne) a shift interval at which upshift is repeatedly executed, may be adopted as the second condition. The second shift mode of the embodiment described in FIG. 7 repeatedly executes upshift every time the engine speed (Ne) reaches a predetermined threshold value (peak value) N. In other words, in the second shift mode, engine speeds (Ne) at which upshift is performed are matched.

In FIG. 7, the longitudinal acceleration (G) of the vehicle 10 and the engine speed (Ne) are represented in order from above on the vertical axis. An initial state shown in FIG. 7 shows a state where the gear stage is set to, for example, the fourth stage, the vehicle 10 is, for example, running at a constant vehicle speed (V) or more along a flat road surface, and the accelerator pedal 22 is not being depressed (power-off). From time t1 to time t4 shown in FIG. 7 are times the same as or similar to those described in FIG. 6, hence detailed descriptions thereof will be omitted here.

At time t4, the second shift mode is switched to. Up until reaching time t4, an acceleration operation in which the accelerator pedal 22 is firmly depressed during running in the fourth gear is being performed, hence the engine speed (Ne) is raised. Moreover, at time t12 after a certain time has elapsed from time t4, the engine speed (Ne) reaches the threshold value N. At this time, the T-ECU 28 starts shift control from the fourth stage to the fifth stage. Shift control to the fifth stage finishes at time t13 after a certain time has elapsed from time t12.

Similarly, at time t14 after a certain time has elapsed from time t13, the engine speed (Ne) reaches the threshold value N. At this time, the T-ECU 28 starts shift control from the fifth stage to the sixth stage. Shift control to the sixth stage finishes at time t15 after a certain time has elapsed from time t14. Similarly, at time t16 after a certain time has elapsed from time t15, the engine speed (Ne) reaches the threshold value N. At this time, the T-ECU 28 starts shift control from the sixth stage to the seventh stage.

As a result, for example, the tone of the engine speed becomes substantially constant for every shift, hence a comfortable sensation of acceleration can be enacted on the driver.

Figure 8:
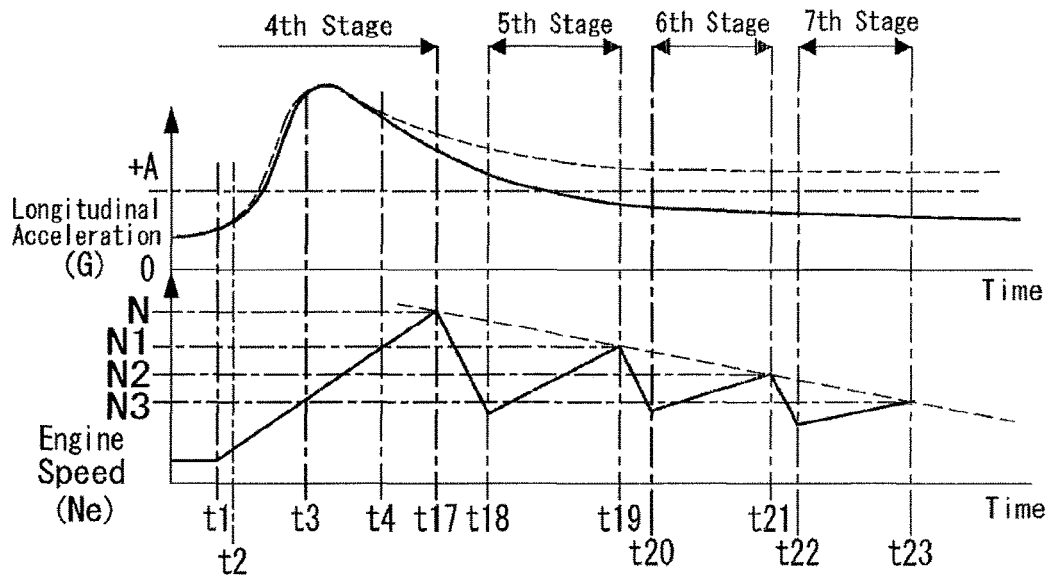
FIG. 8 is a time chart showing still another embodiment of the second shift mode.

FIG. 8 shows another embodiment of the second shift mode. In the embodiment shown in FIG. 8, upshift is executed in the second shift mode every time of reaching, in order, speeds N1, N2, N3 that lower a predetermined certain amount at a time along with time lapse from the predetermined threshold value (peak value) N of the engine speed (Ne).

In FIG. 8, the longitudinal acceleration (G) of the vehicle 10 and the engine speed (Ne) are represented in order from above on the vertical axis. An initial state shown in FIG. 8 shows a state where the gear stage is set to, for example, the fourth gear, the vehicle 10 is, for example, running at a constant vehicle speed (V) or more along a flat road surface, and the accelerator pedal 22 is not being depressed (power-off). From time t1 to time t4, there is operation the same as or similar to that described in FIG. 6, hence detailed description thereof will be omitted here.

As shown in FIG. 8, at time t4, the second shift mode is switched to. Up until reaching time t4, an acceleration operation in which the accelerator pedal 22 is firmly depressed during running in the fourth gear is being performed, hence the engine speed (Ne) is raised. Moreover, at time t17 after a certain time has elapsed from time t4, the engine speed (Ne) reaches the predetermined threshold value (peak value) N. At this time, the T-ECU 28 starts shift control from the fourth stage to the fifth stage. Shift control to the fifth stage finishes at time t18 after a certain time has elapsed from time t17.

At time t19 after a certain time has elapsed from time t18, the engine speed (Ne) reaches the speed N1 lowered by a predetermined certain amount along with time lapse from the peak value N. At this time, the T-ECU 28 starts shift control from the fifth stage to the sixth stage. Shift control to the sixth stage finishes at time t20 after a certain time has elapsed from time t19.

At time t21 after a certain time has elapsed from time t20, the engine speed (Ne) reaches the speed N2 lowered by a predetermined certain amount along with time lapse from the speed N1 representing a shift timing of the previous time. At this time, the T-ECU 28 starts shift control from the sixth stage to the seventh stage. Shift control to the seventh stage finishes at time t22 after a certain time has elapsed from time t21.

Similarly also after that, at time t23 after a certain time has elapsed from time t22, the engine speed (Ne) reaches the speed N3 lowered by a predetermined certain amount along with time lapse from the speed N2 representing a shift timing of the previous time. At this time, the T-ECU 28 starts shift control from the seventh stage to the eighth stage. The predetermined certain amounts, in other words, a speed calculated by subtracting the engine speed N1 from the engine speed N, a speed calculated by subtracting the engine speed N2 from the engine speed N1, and a speed calculated by subtracting the engine speed N3 from the engine speed N2, may be set to the same speed, or may have the speed changed along with time lapse or number of times so as to become sequentially smaller, for example.

As a result, the longitudinal acceleration (G) in the embodiment described in FIG. 8 lowers more gently than the longitudinal acceleration (G) in the embodiment described in FIG. 7. As a result, for example, sound volume of the engine speed gets gradually smaller every shift, hence a comfortable sensation of acceleration can be enacted on the driver.

The above-described embodiments are each exemplifications of the present disclosure, and structures and functions specific to a certain embodiment may be applied also to another embodiment. In addition, the present disclosure is not limited to the above-described embodiments, and changes may be appropriately made in a range not departing from the object of the present disclosure. For example, in the embodiment described in FIG. 8, the shift interval at which upshift is repeatedly executed is fixed at a speed by which the engine speed (Ne) lowers a certain amount at a time along with time lapse. However, the disclosure is not limited to this, and, for example, the shift interval at which upshift is repeatedly executed may be fixed at a speed by which the engine speed (Ne) increases a certain amount at a time along with time lapse. In other words, the shift interval at which upshift is repeatedly executed may be fixed at a plurality of engine speeds aligned in order of time lapse on a locus of the engine speed representing a predetermined change rate.

What is claimed is:

1. A shift control system for vehicle including an automatic transmission that performs an upshift based on an increase in a vehicle speed, comprising:
   a detector that detects a longitudinal acceleration of the vehicle;
   a calculator that calculates a change amount per unit time of an accelerator opening that changes in response to a depression of an accelerator pedal; and
   a controller that controls the automatic transmission,
   wherein the controller is configured to execute consecutive upshifts to reduce a speed ratio of the automatic transmission based on a second condition that determines a shift timing of the consecutive upshifts, upon satisfaction of a first condition in that the longitudinal acceleration is greater than or equal to a predetermined first threshold value, that the change amount is in a stable state within a certain range, and that a time period that the change amount stays within the certain range has exceeded a second threshold value.

2. The shift control system for vehicle according to claim 1, wherein
   the second condition is a condition that a time interval at which the consecutive upshifts are executed is fixed at a constant time.

3. The shift control system for vehicle according to claim 1, wherein
   the second condition is a condition that a shift interval at which the consecutive upshifts are executed is fixed at a constant engine speed.

4. The shift control system for vehicle according to claim 1, wherein the second condition is a condition that a shift interval at which the consecutive upshifts are executed is defined at a plurality of engine speeds aligned in order of time lapse on a locus representing a predetermined change rate of the engine speed.

5. The shift control system for vehicle according to claim 1, wherein
the certain range is a range less than a third threshold value and exceeding a fourth threshold value smaller than the third threshold value, the third threshold value is a threshold value of the change amount on an increase side of the accelerator opening, with respect to a reference value which is the change amount during the stable state, the fourth threshold value is a threshold value of the change amount on a decrease side of the accelerator opening, with respect to the reference value, and an absolute value of the third threshold value is a value larger than an absolute value of the fourth threshold value.

* * * * *